(12) United States Patent
Dubenski (10) Patent No.: US 11,453,509 B2
(45) Date of Patent: Sep. 27, 2022

(54) SYSTEM AND PROCESS

(71) Applicant: Air BP Limited, Middlesex (GB)

(72) Inventor: Paul Jerzy Dubenski, Middlesex (GB)

(73) Assignee: Air BP Limited, Middlesex (GB)

( * ) Notice: Subject to any disclaimer, the term of this patent is extended or adjusted under 35 U.S.C. 154(b) by 747 days.

(21) Appl. No.: 16/333,999

(22) PCT Filed: Sep. 20, 2017

(86) PCT No.: PCT/EP2017/073799
§ 371 (c)(1),
(2) Date: Mar. 15, 2019

(87) PCT Pub. No.: WO2018/054987
PCT Pub. Date: Mar. 29, 2018

(65) Prior Publication Data
US 2019/0256219 A1    Aug. 22, 2019

(30) Foreign Application Priority Data
Sep. 22, 2016   (GB) ...................... 1616123

(51) Int. Cl.
*B64D 37/16*    (2006.01)
*B64D 37/32*    (2006.01)
(Continued)

(52) U.S. Cl.
CPC .............. *B64D 37/16* (2013.01); *B64D 37/32* (2013.01); *B64F 1/28* (2013.01); *B67D 7/348* (2013.01)

(58) Field of Classification Search
CPC ........... B64D 37/16; B64D 37/32; B64F 1/28; B67D 7/348
See application file for complete search history.

(56) References Cited

U.S. PATENT DOCUMENTS 9,340,298 B1    5/2016 Dunn, Jr. et al.
9,881,432 B2 *  1/2018 McQuade ............ G08G 1/0175
(Continued)

FOREIGN PATENT DOCUMENTS

EP          2581309 A2    4/2013
WO     WO2016/115011    7/2016

*Primary Examiner* — Seung H Lee
(74) *Attorney, Agent, or Firm* — McDonnell Boehnen Hulbert & Berghoff LLP (57) ABSTRACT

A refuelling system suitable for use with an overwing fuelled aircraft comprising: (b) a stored fuel grade identification means for identifying the fuel grade stored in the fuel storage vessel and available type(s) of delivery of the fuel to the aircraft; (d) an aircraft fuel grade identification means being attached to, or forming part of, an overwing fuelled aircraft, wherein said aircraft fuel grade identification means represents the fuel grade requirement of the aircraft and is readable from the exterior of the aircraft; (g) a transmission and receiving system which enables information regarding the fuel grade that had previously been supplied to the aircraft having the aircraft registration number inputted into the computer interface and the type of delivery of fuel which may be used by said aircraft to be retrieved from a remote database; (i) an automated cross-check system which is configured to retrieve the fuel grades identified by the fuel identification means in (b), retrieve the fuel grade identified in (d) from the hand-held device, retrieve the type(s) of delivery of fuel identified by the fuel identification means in (b) and by the system of element (g), and the previous fuel grade supplied to the aircraft identified by the system in element (g) which can generate a positive response signal if all of the fuel grades identified are compatible with each other and the type(s) of delivery of fuel to the aircraft are compatible.

15 Claims, 2 Drawing Sheets

(51) Int. Cl.
   *B64F 1/28*    (2006.01)
   *B67D 7/34*    (2010.01)

(56) References Cited

U.S. PATENT DOCUMENTS

2004/0140354 A1    7/2004   Demere
   2009/0315729 A1   12/2009   Inhoffer
   2012/0173072 A1    7/2012   Portcullis et al.

* cited by examiner

SYSTEM AND PROCESS

CROSS REFERENCE TO RELATED APPLICATIONS

This application is a National Phase application of, and claims the benefit of, International (PCT) Application No. PCT/EP2017/073799, filed Sep. 20, 2017, which claims priority to GB Patent Application No. 1616123.4, filed Sep. 22, 2016, each of which is hereby incorporated by reference in its entirety.

The present invention relates to an aircraft refuelling system and a process for refuelling aircraft using said system.

There are many grades of aviation fuel currently available and in use at airfields around the world. Depending upon the type of engine used by the aircraft, a specific grade of aircraft fuel having properties which meet the requirements of the engine is required for the safe and reliable operation of the aircraft. If an aircraft is fuelled with an aircraft fuel which does not meet the requirements of the engine of the aircraft, i.e. it is misfuelled, there is a risk that the engine would not operate reliably and may even lead to a total performance failure of the engine.

Aircraft are designed to be normally fuelled using one of two different types of fuelling procedure: (i) pressure fuelling—using a pressurised fuelling nozzle positively coupled to the aircraft fuel tank adaptor; or, (ii) overwing fuelling—using an open ended fuelling nozzle inserted directly into the aircraft fuel tank orifice(s), which are typically located on the top of the aircraft wings or on the aircraft fuselage. Misfuelling risks arise most commonly with overwing fuelling since the equipment used to deliver the fuel into the aircraft is similar and allows the wrong grade of fuel to be delivered into the aircraft fuel tanks.

Currently, the checks performed to ensure that the aircraft fuel being supplied to an aircraft is compatible with the engine of that aircraft are usually performed by the person or people responsible for performing the refuelling the aircraft and/or the owner or operator of the aircraft.

Several systems have been proposed misfuelling prevention of vehicles which involve the use of a fuel requirement identification means which is readable by a fuel dispensing means, however such systems are a simple double-checking of the information which is, or should be, available to the person or people responsible for performing the refuelling of the vehicle.

There is an ongoing desire to reduce the chances of misfuelling aircraft and for systems that can help in reducing the chances of misfuelling or even preventing the misfuelling of aircraft.

The present invention provides a system which performs an additional set of checks based upon multiple sources of information available at the point of refuelling and provides a system which would only enable refuelling should such additional checks be satisfied that the aircraft fuel stored in the fuel storage vessel of the fuel dispensing system is compatible with the engine of the aircraft being refuelled. Such a system may be used to supplement the checks being performed by the person or people responsible for performing the refuelling the aircraft and/or the owner or operator of the aircraft and to introduce an additional system that would help prevent refuelling of the aircraft with an incompatible aircraft fuel based upon the information available at the point of refuelling.

Accordingly, the present invention provides a refuelling system suitable for use with an overwing fuelled aircraft comprising:
(a) a fuel storage vessel capable of storing aircraft fuel;
(b) a stored fuel grade identification means for identifying the fuel grade stored in the fuel storage vessel and available type(s) of delivery of the fuel to the aircraft;
(c) a fuel dispensing system fluidly connected to the fuel storage vessel comprising a means of delivering fuel to an overwing fuelled aircraft and a mechanism that permits or prevents the dispensing of the stored aircraft fuel;
(d) an aircraft fuel grade identification means being attached to, or forming part of, an overwing fuelled aircraft, wherein said aircraft fuel grade identification means represents the fuel grade requirement of the aircraft and is readable from the exterior of the aircraft;
(e) a hand-held device comprising a means for reading the aircraft fuel grade identification means;
(f) a computer interface where the aircraft registration number can be inputted;
(g) a transmission and receiving system which enables information regarding the fuel grade that had previously been supplied to the aircraft having the aircraft registration number inputted into the computer interface and the type of delivery of fuel which may be used by said aircraft to be retrieved from a remote database;
(h) optionally, a customer identification system which comprises a customer identification card and/or number, and a processing system which comprises a transmission and receiving system, wherein the customer identification system is capable of obtaining at least the customer name and the fuel grade from the customer identification card and/or a database entry associated with the customer identification number;
(i) an automated cross-check system which is configured to retrieve the fuel grades identified by the fuel identification means in (b), retrieve the fuel grade identified in (d) from the hand-held device, retrieve the type(s) of delivery of fuel identified by the fuel identification means in (b) and by the system of element (g), and the previous fuel grade supplied to the aircraft identified by the system in element (g) and optionally also in element (h), which can generate a positive response signal if all of the fuel grades identified are compatible with each other and the type(s) of delivery of fuel to the aircraft are compatible; and
(j) a signal processing system which can process the positive response signal generated by the automated cross-check system, which signal processing system interfaces with the mechanism that permits or prevents the dispensing of aircraft fuel through the fuel dispensing system and will allow the refuelling to proceed if the automated cross-check system generates a positive signal.

The present invention further provides a process for refuelling an overwing fuelled aircraft from a fuel storage vessel comprising a stored aircraft fuel to the aircraft through a fuel dispensing system fluidly connected to the fuel storage vessel, wherein the fuel dispensing system comprises a mechanism the permits or prevents the dispensing of the stored aircraft fuel, wherein the process comprises the following steps:
(1) inputting the aircraft registration number of the aircraft to be refuelled into a computer interface and, using a transmission and receiving system, retrieving information regarding the fuel grade that had previously been supplied to the aircraft having the aircraft registration number inputted into the computer interface and the type of delivery of fuel which may be used by said aircraft from a remote database;

(2) using a hand-held device, identifying the fuel grade required by the aircraft by reading the fuel grade indicated on an aircraft from an aircraft fuel grade identification means attached to, or forming part of, an aircraft, wherein said aircraft fuel grade identification means is readable from the exterior of the aircraft;

(3) optionally, identifying the operator and/or owner of the aircraft from a customer identification card and/or number, and obtaining at least the customer name and the fuel grade from a customer identification system wherein the customer identification system comprises a processing system which comprises a transmission and receiving system, wherein the customer identification system is capable of obtaining at least the customer name and the fuel grade from the customer identification card and/or a database entry associated with the customer identification number;

(4) identifying the fuel grade stored in the fuel storage vessel and available type(s) of delivery of the fuel to the aircraft from a stored fuel grade identification means;

(5) performing a cross-check of the fuel grades and available type(s) of delivery using an automated cross-check system, wherein the automated cross-check system is configured to retrieve the fuel grades identified in step (2) and step (4), retrieve the type(s) of delivery of fuel identified in step (4) and by the system of step (1), and the previous fuel grade supplied to the aircraft identified by the system of step (1) and optionally also in step (3), wherein the automated cross-check system generates a positive response signal if all of the fuel grades identified are compatible with each other and the type(s) of delivery of fuel to the aircraft are compatible; and (6) receiving the positive signal generated by the automated cross-check system in a signal processing system which interfaces with the mechanism that permits or prevents the dispensing of aircraft fuel through the fuel dispensing system, and permitting the refuelling of the aircraft to proceed.

DETAILED DESCRIPTION

In the present invention, the aircraft refers to an aircraft which is fuelled by overwing fuelling. In some or all embodiments of the present invention, the aircraft is an airplane comprising a jet engine or a piston engine. In some or all embodiments of the present invention, the aircraft is an overwing fuelled airplane comprising a piston engine. In some or all embodiments of the present invention, the aircraft is an overwing fuelled airplane comprising a jet engine. In some or all embodiments, the aircraft is an overwing fuelled airplane comprising an engine which is fuelled by aviation gasoline. In some or all embodiments, the aircraft is an overwing fuelled airplane comprising an engine which is fuelled by jet fuel. In some or all embodiments, the aircraft is an overwing fuelled airplane comprising an engine which is fuelled by aviation Diesel fuel.

In the present invention, the aircraft fuel is any grade of liquid hydrocarbon fuel suitable for fuelling an aircraft. Typically, the aircraft fuel is selected from one or more grades of aviation gasoline, aviation Diesel fuel and jet fuel. In some or all embodiments of the invention, the aircraft fuel is selected from one or more grade aviation gasoline and jet fuels. In some or all embodiments of the invention, the aircraft fuel is selected from one or more grades of aviation gasoline.

In the present invention, the aircraft fuel grade identification means being attached to, or forming part of, an aircraft, represents the fuel grade requirement of the aircraft and is readable from the exterior of the aircraft may be any visual or electronically readable means that is readable by the hand-held device. In some or all embodiments, the aircraft fuel grade identification means comprises a visual representation of the fuel grade required by the aircraft which is readable by the user of the refuelling system and the pilot of the aircraft, typically such a visual representation will comprise an indication of the type of fuel (e.g. gasoline, jet, etc.) as well as the specific grade of that type of fuel; advantageously, standard forms of such visual representations of type of fuel and fuel grade currently exist and are in use; such forms may include an indication of the type of fuel as well as the specific grade of that type of fuel in text form in addition or in place of representation in the form of a symbol. In some or all embodiments, the aircraft fuel grade identification means comprises a visual representation which is machine readable, for example a barcode or a Quick Response Code ("QR Code"), or other similar machine readable code. In some or all embodiments, the aircraft fuel grade identification means comprises information stored on a Near-Field Communication ("NFC") device or a Radio-Frequency Identification ("RFID") device. Multiple forms of aircraft fuel grade identification means may be present. Preferably, the aircraft fuel grade identification means comprises a visual representation of the fuel grade required by the aircraft which is readable by the user of the refuelling system and the pilot of the aircraft, thus assisting the pilot of the aircraft to refuel the aircraft with the correct fuel grade at airfields where the aircraft refuelling system of the present invention is not available.

In the present invention, the hand-held device comprising a means for reading the aircraft fuel grade identification means used in the system comprises a means for reading the fuel grade identification means that is capable of reading the aircraft fuel grade identification means that is attached to or forms part of the aircraft. In the embodiments of the invention wherein the aircraft fuel grade identification means comprises a visual representation of the fuel grade required by the aircraft which is readable by the user of the refuelling system and the pilot of the aircraft, the means for reading the aircraft fuel grade identification means will comprise a system comprising a camera and visual recognition software which can process the image and identify the fuel grade from the visual representation or through optical character recognition of key words. In the embodiments of the invention wherein the aircraft fuel grade identification means comprises a visual representation which is machine readable, for example a barcode or a QR code, the means for reading the aircraft fuel grade identification means will comprise a system comprising a suitable means for reading such a machine readable visual identification, for example a camera and suitable software for interpreting the machine readable visual identification. In the embodiments of the invention wherein the aircraft fuel grade identification comprises information stored on a near-field communication ("NFC") device or a radio-frequency identification ("RFID") device, the means for reading the aircraft fuel grade identification means will comprise a system capable of reading the information stored on such devices. The hand-held device may comprise means of reading multiple types of aircraft fuel grade identification means.

Optionally, the hand-held device may also provide an interface where the aircraft fuel grade can be entered manually in case it is unable to read the aircraft fuel identification means, for example, if the aircraft fuel identification means has become damage beyond the capabilities of recognition.

The hand-held device may be any suitable hand-held device which comprises the functionality that is required of it. In some or all embodiments, the hand-held device will be a tablet computer. In some or all embodiments of the invention, the hand-held device will be a smart phone.

In the present invention, the computer interface where the aircraft registration number can be inputted communicates with the transmission and receiving system and enables information regarding the fuel grade that had previously been supplied to the aircraft having the aircraft registration inputted into the computer interface to be retrieved from a remote database. In some or all embodiments of the present invention, the computer interface where the aircraft registration number can be inputted is present on the hand-held device. The method of inputting the aircraft registration number is not limited, and can be through any means available, non-limiting examples include the aircraft registration number being typed in by the operator of the refuelling system, through a system comprising a camera and visual recognition software which can process the image and identify the aircraft registration number through optical character recognition, or by selection of the aircraft registration from one or more aircraft registration numbers which are pre-loaded for selection. In the present invention, the term computer interface where the aircraft registration can be inputted includes a computer interface where the aircraft registration can be inputted through typing on a keyboard, keypad, virtual keyboard, or the like. In the present invention, the term computer interface where the aircraft registration can be inputted includes a system comprising a camera and visual recognition software which can process the image and identify the aircraft registration number through optical character recognition; accordingly, the act of inputting the aircraft registration into a computer interface also includes using the camera to take an image of the aircraft registration number on the aircraft. In the present invention, the term computer interface where the aircraft registration can be inputted includes a computer interface where the aircraft registration can be selected from one or more aircraft registration numbers which are pre-loaded for selection; accordingly, the act of inputting the aircraft registration into a computer interface also includes the act of selecting the aircraft registration number from one or more pre-loaded aircraft registration numbers available at the computer interface. In some or all embodiments of the present invention, the hand-held device is pre-loaded with one or more aircraft registration numbers so that the user can use the hand-held device to select the aircraft registration number from a pre-loaded option available on the hand-held device.

The transmission and receiving of the information by the transmission and receiving system may occur by conventional means for transmitting and receiving computer data between two remotely located computers. In some or all embodiments of the present invention, the transmission and receiving system forms part of the hand-held device. In some or all embodiments of the present invention, the computer interface where the aircraft registration number can be inputted and the transmission and receiving system are incorporated in to the hand-held device.

Depending upon the customer information held on a customer identification card or associated with the customer through use of a customer number, the optional customer identification system may be used to provide a further confirmatory check of the aircraft fuel grades associated with the customer, grades of fuel previously supplied to the aircraft, and may also be able to be used to confirm the identity of the aircraft by providing confirmation of the aircraft registration number. Additionally, the optional customer identification system may be able to process the purchase of the fuel about to be dispensed or be used to confirm that the fuel about to be dispensed has been allocated for use with the customer or aircraft identified. In the embodiments of the invention where a customer identification card is used, the customer identification system comprises a means of reading the customer identification card. The optional customer identification system comprises at least one interface where the customer identification card can be read or a customer number can be inputted, and also comprises a transmission and receiving means that is capable of transmitting data generated from the customer identification card and/or number inputted into the interface and retrieve information associated with the customer from an entry in a database. In some or all embodiments of the present invention, the hand-held device forms part of the optional customer identification system and can provide the interface where the customer identification card can be read or a customer number can be inputted, or the transmission and receiving system, or both.

In the present invention, the fuel storage vessel capable of storing aircraft fuel is any vessel capable of storing aircraft fuel. In some or all embodiments of the invention, the fuel storage vessel is a fuel storage vessel fixed in a permanent location at or near an airfield. In other embodiments of the invention, the fuel storage vessel is a fuel storage vessel which is mobile. In some or all embodiments of the invention, the fuel storage vessel forms part of a motor vehicle or forms part of a trailer that may be attached to a motor vehicle.

In the present invention, the fuel dispensing system fluidly connected to the fuel storage vessel comprising a mechanism that permits or prevents the dispensing of the stored aircraft fuel is any system that is capable of dispensing fuel from the fuel storage vessel to an aircraft comprising a mechanism that may be actuated to permit the flow of fuel from the storage vessel to the aircraft through a suitable conduit which is fluidly connected to the fuel storage vessel, or prevent such flow of fuel to the aircraft. Typically, the fuel dispensing system comprises a hose wherein one end of the hose is connected to a fuel dispensing nozzle and the other end of the hose is fluidly connected to the fuel storage vessel, wherein the aircraft fuel is dispensed to the aircraft by being pumped from the fuel storage vessel through the hose. In one embodiment, the mechanism that permits or prevents the dispensing of the stored aircraft fuel is a valve located within the conduit through which the aircraft fuel flows between the fuel storage vessel and the aircraft. In another embodiment, the mechanism that permits or prevents the dispensing of the stored aircraft fuel is a pump which can be activated to enable the dispensing of the fuel by the pumping of fuel from the fuel storage vessel to the aircraft or can be turned off in order to prevent the dispensing of the fuel by such means. In another embodiment, the dispensing of the fuel comprises a pump which can be activated to enable the dispensing of the fuel by the pumping of fuel from the fuel storage vessel to the aircraft or can be turned off in order to prevent the dispensing of the fuel by such means, and a valve located within the conduit through which the aircraft fuel flows between the fuel storage vessel and the aircraft.

The fuel dispensing system may be permanently attached to the fuel storage vessel or may be mobile and moved to the desired location for the dispensing of fuel and attached to the fuel storage vessel at the desired location for refuelling. In some or all embodiments of the invention, the fuel dispensing system forms part of a motor vehicle or forms part of a trailer that may be attached to a motor vehicle, and the fuel storage vessel capable of storing aircraft fuel is a fuel storage vessel that is fixed in a permanent location at or near an airfield, and is fluidly connected to a fuel hydrant located at a location convenient for a vehicle comprising a fuel dispensing system to connect to the fuel hydrant to enable refuelling of aircraft to occur.

In the present invention, the stored fuel grade identification means for identifying the fuel grade stored in the fuel storage vessel and type(s) of delivery of the fuel to the aircraft is an identification means that is readable or accessible by the automated cross-check system. The stored fuel grade identification means may comprise an identification means that directly identifies the fuel grade stored in the fuel storage vessel and type(s) of delivery of the fuel to the aircraft, or may identify a specific fuel storage vessel and/or a specific fuel dispensing system, and the identity of the fuel storage vessel and/or fuel dispensing system can be used by a system to provide the information concerning the fuel grade stored in the fuel storage vessel and type(s) of delivery of the fuel to the aircraft to the automated cross-check system. In some or all embodiments of the present invention, the stored fuel grade identification means will comprise electronically stored information which identifies the fuel grade stored in the fuel storage vessel as well as the type(s) of delivery of the fuel to the aircraft, wherein said electronically stored information is accessible to at least the automated cross-check system. In some or all embodiments of the present invention, the stored fuel grade identification means will comprise electronically stored information which identifies a fuel storage vessel and/or a fuel dispensing system, and information regarding the fuel grade stored in the fuel storage vessel as well as the type(s) of delivery of the fuel to the aircraft is identified from the identity of the fuel storage vessel and/or the fuel dispensing system identified, and this information is accessible to at least the automated cross-check system In some or all embodiments of the invention, the stored fuel grade identification means will comprise any visual or electronically readable means that is readable by the hand-held device, wherein the hand-held device is used to read the stored fuel identification means and identify the fuel grade stored in the fuel storage vessel as well as the type(s) of delivery of the fuel to the aircraft from the stored fuel identification means and make this information accessible to at least the automated cross-check system; in this embodiment, the visual or electronically readable means may be independently selected from any of those used as the aircraft fuel grade identification means and the method by which the such information would be read by the hand-held device would be the corresponding method to the visual or electronically readable means as previously identified in respect of the use of the hand-held device reading the aircraft fuel grade identification means. In one specific embodiment, the stored fuel grade identification means will comprise an electronically readable means selected from an NFC device or an RFID device that is readable by the hand-held device, wherein the hand-held device is used to read the stored fuel identification means and identify the fuel grade stored in the fuel storage vessel as well as the type(s) of delivery of the fuel to the aircraft from the stored fuel identification means and make this information accessible to at least the automated cross-check system; in specific implementations of this embodiment, the fuel storage vessel forms part of a motor vehicle or forms part of a trailer that being attached to a motor vehicle, and the NFC device or the RFID device will be present inside the cabin of the motor vehicle, for example as a separate identification means affixed to the inside of the cabin or forming part of a dock for the hand-held device.

In the present invention, the automated cross-check system is configured to retrieve the fuel grades identified by the stored fuel identification means and retrieves from the hand-held device the fuel grade identified from the aircraft fuel identification means and confirms that they are both compatible; additionally, the previous fuel grade supplied to the aircraft retrieved from the transmission and receiving system which was used to retrieve information from a remote database based upon the aircraft registration number that had been inputted into the computer interface, and optionally also from the customer identification system, is also compared to the fuel grades identified by the stored fuel identification means and the aircraft fuel identification means, and confirms that they are compatible. Further, the automated cross-check system also retrieves the type(s) of delivery of fuel identified by the stored fuel identification and retrieves the type of delivery of fuel that may be used by the aircraft from the transmission and receiving system which was used to retrieve information from a remote database based upon the aircraft registration number that had been inputted into the computer interface, and confirms that they are both compatible. In the embodiments wherein the customer identification system is used by the automated cross-check system, and the customer information held on a customer identification card or associated with the customer through use of a customer number comprises an aircraft registration number, an optional additional check can be performed by the automated cross-check system to confirm that the aircraft registration number inputted into the computer interface matches the, or one of, the aircraft registration number(s) identified by the customer identification system.

Should all of the checks performed by the automated cross-check system confirm that the fuel grades identified are compatible and that the types of fuel delivery to the aircraft are compatible, the automated cross-check system will generated a positive response signal.

The automated cross-check system can be any suitable system that is capable of retrieving the necessary information, performing the cross-checks, and generating a positive response signal. In some or all embodiments of the present invention, the automated cross-check system is a computer which is located locally to the fuel dispensing system. In some or all embodiments, the automated cross-check system is incorporated into the hand-held device.

The signal processing system of the present invention interfaces with the mechanism that permits or prevents the dispensing of aircraft fuel through the fuel dispensing system is configured to receive the positive response signal generated by the automated cross-check system and will process such a positive response signal in order to actuate the mechanism to allow the refuelling to proceed. In one particular embodiment of the present invention, if no positive response signal is received and processed by the signal processing system, the mechanism that permits or prevents the dispensing of aircraft fuel through the fuel dispensing system will be prevented from being actuated and as such the dispensing of fuel through the fuel dispensing nozzle will be prevented.

In some or all embodiments of the invention, the fuel dispensing system is capable of delivering fuel to an aircraft through both pressure fuelling and overwing fuelling and comprises an overwing fuelling isolation valve and a system which can identify the orientation of the isolation valve, and wherein the automated cross-check system performs a check that the overwing fuelling isolation valve is oriented such that overwing fuelling can be performed and pressure fuelling cannot be performed, and will only permit a positive response signal to be generated if the overwing fuelling valve is so oriented.

In some or all embodiments of the invention, the fuel dispensing system is capable of delivering fuel to an aircraft through both pressure fuelling and overwing fuelling and comprises an overwing fuelling isolation valve, and wherein the mechanism that permits or prevents the dispensing of stored fuel is configured such that it will prevent the dispensing of stored fuel through the fuel dispensing nozzle unless the overwing fuelling isolation valve is oriented such that overwing fuelling can be performed and pressure fuelling cannot be performed.

In some or all embodiments of the invention, the fuel dispensing system is capable of delivering fuel to an aircraft through both pressure fuelling and overwing fuelling and comprises an overwing fuelling isolation valve, and wherein the mechanism that permits or prevents the dispensing of stored fuel is configured such that it will prevent the dispensing of stored fuel through the overwing fuel dispensing nozzle if the type of delivery of fuel identified in any of the elements of the refuelling system identifies that the type of fuel delivery is by pressure fuelling.

In some or all embodiments of the invention, the fuel dispensing system is capable of delivering fuel to an aircraft through both pressure fuelling and overwing fuelling, wherein the fuel dispensing system is configured such that it will prevent the dispensing of stored fuel through the pressure fuel dispensing system if the nozzle for the overwing fuelling system is removed from its stowage point.

In some or all embodiments of the invention, the hand-held device is a computer device, such as a tablet computer, and at least the processes of inputting the aircraft registration number through a computer interface, reading the aircraft fuel grade identification means, transmitting and receiving information regarding the fuel grade that had previously been supplied to the aircraft having the aircraft registration number inputted, performing the compatibility checks of the automated cross-check system, and generating the positive response signal, are all performed on the hand-held device through a single unifying program or operating system. In some or all embodiments of the invention, the hand-held device is a computer device, such as a tablet computer, and at least the processes of inputting the aircraft registration number through a computer interface, reading the aircraft fuel grade identification means, transmitting and receiving information regarding the fuel grade that had previously been supplied to the aircraft having the aircraft registration number inputted, identifying the fuel grade stored in the fuel storage vessel and available type(s) of delivery of the fuel to the aircraft, performing the compatibility checks of the automated cross-check system, and generating the positive response signal, are all performed on the hand-held device through a single unifying program or operating system. Optionally, in such embodiments of the invention, the single unifying program or operating system installed on the hand-held device can also form part of the optional customer identification system and will provide at least the receive information from an interface where the customer identification card can be read, or will provide an interface where a customer number can be inputted, or both.

The present invention further provides a process for refuelling an overwing fuelled aircraft from a fuel storage vessel comprising a stored aircraft fuel to the aircraft through a fuel dispensing system fluidly connected to the fuel storage vessel, wherein the fuel dispensing system comprises a mechanism the permits or prevents the dispensing of the stored aircraft fuel, using a refuelling system as described herein.

In the process for refuelling an overwing fuelled aircraft of the present invention, information regarding the fuel grade(s) which the aircraft can use, the fuel grade(s) stored in the fuel storage vessel, the type(s) of fuel delivery of the fuel to the aircraft that is required, and the type(s) of fuel delivery of the fuel to the aircraft that that is/are available in the fuel dispensing system are all identified using the various means previously described.

In the process for refuelling an overwing fuelled aircraft of the present invention, the aircraft registration number of the aircraft to be refuelled is inputted into a computer interface and, using a transmission and receiving system, information regarding the fuel grade that had previously been supplied to the aircraft having the aircraft registration number inputted into the computer interface and the type of delivery of fuel which may be used by said aircraft is retrieved from a remote database. The computer interface, and the means by which the aircraft registration number of the aircraft to be refuelled can be inputted into a computer interface and information regarding the fuel grade that had previously been supplied to the aircraft having the aircraft registration number retrieved from a remote database are as previously described.

In the process for refuelling an overwing fuelled aircraft of the present invention, the fuel grade required by the aircraft is identified by reading the fuel grade indicated on an aircraft from an aircraft fuel grade identification means using the hand-held device. The aircraft fuel identification means, the hand-held device and the means by which the aircraft fuel grade identification means is read using the hand-held device are as previously described.

Optionally, the process for refuelling an overwing fuelled aircraft of the present invention may also comprise the step of identifying the operator and/or owner of the aircraft from a customer identification card and/or number, and obtaining at least the customer name and the fuel grade from a customer identification system wherein the customer identification system comprises a processing system which comprises a transmission and receiving system, wherein the customer identification system is capable of obtaining at least the customer name and the fuel grade from the customer identification card and/or a database entry associated with the customer identification number. The customer identification card and/or number, the customer identification system comprising a processing system which comprises a transmission and receiving system, and the means by which the customer name and the fuel grade are identified from a customer identification system are as previously described.

In the process for refuelling an overwing fuelled aircraft of the present invention, the fuel grade stored in the fuel storage vessel and available type(s) of delivery of the fuel to the aircraft are identified from the stored fuel grade identification means. The stored fuel identification means and the means by which the fuel grade(s) and type(s) of delivery are identified from the stored fuel identification means are as previously described.

In the process for refuelling an overwing fuelled aircraft of the present invention, the steps where the information regarding the fuel grade(s) which the aircraft can use, the fuel grade(s) stored in the fuel storage vessel, the type(s) of fuel delivery of the fuel to the aircraft that is required, and the type(s) of fuel delivery of the fuel to the aircraft that that is/are available in the fuel dispensing system may be performed in any sequence. In some or all embodiments, the grade of fuel in the fuel storage vessel and the type(s) of fuel delivery of the fuel to the aircraft are identified in advance of the identification of the aircraft or the fuel grade required by the aircraft; for example, for a fuel storage vessel that only contains a single fuel grade and/or only possesses a single type of fuel delivery of the fuel to the aircraft. In some or all embodiments of the process for refuelling an overwing aircraft of the present invention, the aircraft registration is inputted into a computer interface before the aircraft fuel grade identification means is read by the hand-held device. In some or all embodiments wherein the optional customer identification system is used, the step which uses the customer identification system is performed before either the step wherein the aircraft registration number is inputted into a computer interface or reading the aircraft fuel identification means using the hand-held device are performed. In a specific embodiment, the aircraft registration is inputted into a computer interface before the aircraft fuel grade identification means is read by the hand-held device, after which the grade of fuel in the fuel storage vessel and the type(s) of fuel delivery of the fuel to the aircraft are identified by reading the stored fuel grade identification means using hand-held device.

In the process for refuelling an overwing fuelled aircraft of the present invention, a cross-check of the fuel grades and available type(s) of delivery using an automated cross-check system is performed, wherein the automated cross-check system is configured to retrieve the fuel grades identified from the stored fuel identification means and the aircraft fuel grade identification means, retrieve the type(s) of delivery of fuel identified from the stored fuel identification means and identified through the system wherein the aircraft registration number is entered into a computer interface, and the previous fuel grade supplied to the aircraft identified by said system, and also optionally as identified through the optional step involving the use of a customer identification system as described, wherein the automated cross-check system generates a positive response signal if all of the fuel grades identified are compatible with each other and the type(s) of delivery of fuel to the aircraft are compatible. Further details regarding the automated cross-check system and the means by which the cross-check system will retrieve the necessary information are as previously described.

In the process for refuelling an overwing fuelled aircraft of the present invention, the positive signal generated by the automated cross-check system is received and processed by a signal processing system which interfaces with the mechanism that permits or prevents the dispensing of aircraft fuel through the fuel dispensing system, and upon receiving and processing a positive signal, the refuelling of the aircraft is permitted to proceed. Further details regarding the signal processing system, the mechanism that permits or prevents the dispensing of aircraft fuel through the fuel dispensing system and the means by which the signal processing system and the mechanism that permits or prevents the dispensing of aircraft fuel through the fuel dispensing system operate are as previously described.

In some or all embodiments of the process of the present invention, if the fuel dispensing system is capable of delivering fuel to an aircraft through both pressure fuelling and overwing fuelling, if the type of delivery of fuel identified in any of the steps of the process identifies that the type of fuel delivery is by pressure fuelling, then fuel delivery through the overwing fuelling system is prevented.

In some or all embodiments of the process of the present invention, if the fuel dispensing system is capable of delivering fuel to an aircraft through both pressure fuelling and overwing fuelling, if the nozzle for the overwing fuelling system is removed from its stowage point, delivery of fuel through the pressure fuelling system is prevented.

Figure 1:
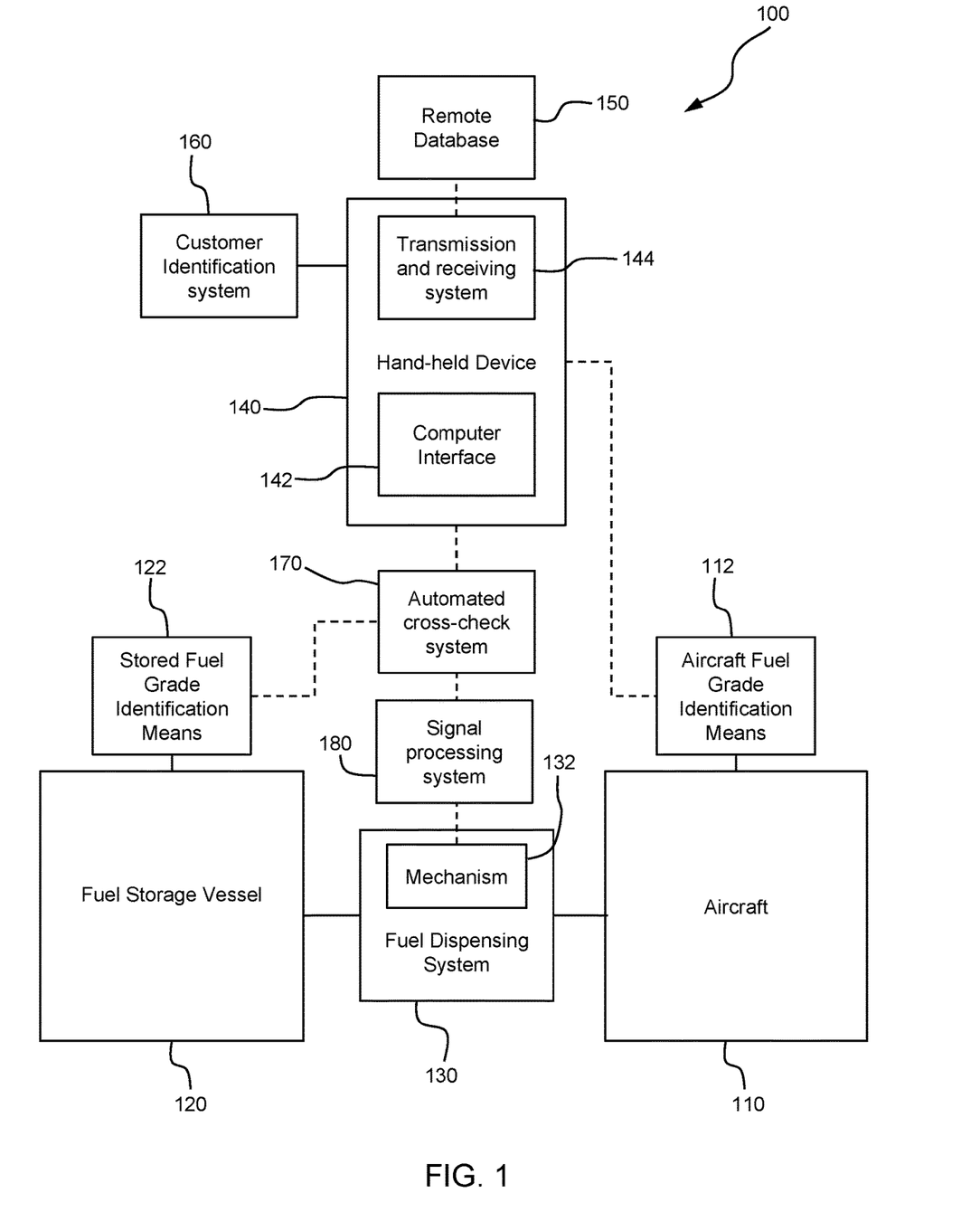
FIG. 1 shows a refuelling system.

FIG. 1 shows a refuelling system 100 suitable for use with an overwing fuelled aircraft 110. System 100 includes a fuel storage vessel 120 capable of storing aircraft fuel, a fuel dispensing system 130 fluidly connected to the fuel storage vessel 120, and a handheld device 140.

The system 100 also includes a stored fuel grade identification means 122 for identifying the fuel grade stored in the fuel storage vessel 120 and available type(s) of delivery of the fuel to the aircraft 110. In one specific embodiment, the stored fuel grade identification means 122 will comprise an electronically readable means selected from an NFC device or an RFID device that is readable by the hand-held device 140, where the hand-held device is used to read the stored fuel identification means 122 and identify the fuel grade stored in the fuel storage vessel 120 as well as the type(s) of delivery of the fuel to the aircraft from the stored fuel identification means. In specific implementations of this embodiment, the fuel storage vessel 120 forms part of a motor vehicle or forms part of a trailer that being attached to a motor vehicle, and the fuel grade identification means 122 formed by the NFC device or the RFID device will be present inside the cabin of the motor vehicle, for example as a separate identification means affixed to the inside of the cabin or forming part of a dock for the hand-held device 140.

The fuel dispensing system 130 comprises a means of delivering fuel to an overwing fuelled aircraft and a mechanism 132 that permits or prevents the dispensing of the stored aircraft fuel.

The system 100 also includes an aircraft fuel grade identification means 112 attached to, or forming part of, an overwing fuelled aircraft 110, where the aircraft fuel grade identification means 112 represents the fuel grade requirement of the aircraft 110 and is readable from the exterior of the aircraft 110.

The hand-held device 140 comprises a means for reading the aircraft fuel grade identification means 112.

The system 100 also includes a computer interface 142 where the aircraft registration number can be inputted. In some or all embodiments of the present invention, the computer interface 142 where the aircraft registration number can be inputted is present on the hand-held device 140.

The system 100 also includes a transmission and receiving system 144 which enables information regarding the fuel grade that had previously been supplied to the aircraft 110 having the aircraft registration number inputted into the computer interface 142 and the type of delivery of fuel which may be used by said aircraft 110 to be retrieved from a remote database 150. In some or all embodiments of the present invention, the transmission and receiving system 144 forms part of the hand-held device 140.

Optionally, the system 100 also includes a customer identification system 160 which comprises a customer identification card and/or number, and a processing system which comprises a transmission and receiving system, wherein the customer identification system 160 is capable of obtaining at least the customer name and the fuel grade from the customer identification card and/or a database entry associated with the customer identification number.

The system 100 also includes an automated cross-check system 170 which is configured to retrieve the fuel grades identified by the stored fuel identification means 122, retrieve, from the handheld device 140, the fuel grade identified from the aircraft fuel grade identification means 122, retrieve the type(s) of delivery of fuel identified by the stored fuel identification means 112 and by the transmission and receiving system 144, and the previous fuel grade supplied to the aircraft identified by the transmission and receiving system 144 and optionally also the customer identification system 160, which can generate a positive response signal if all of the fuel grades identified are compatible with each other and the type(s) of delivery of fuel to the aircraft 110 are compatible.

The system 100 also includes a signal processing system 180 which can process the positive response signal generated by the automated cross-check system 170. The signal processing system 180 interfaces with the mechanism 132 that permits or prevents the dispensing of aircraft fuel through the fuel dispensing system 130 and will allow the refuelling to proceed if the automated cross-check system 170 generates a positive signal.

Figure 2:
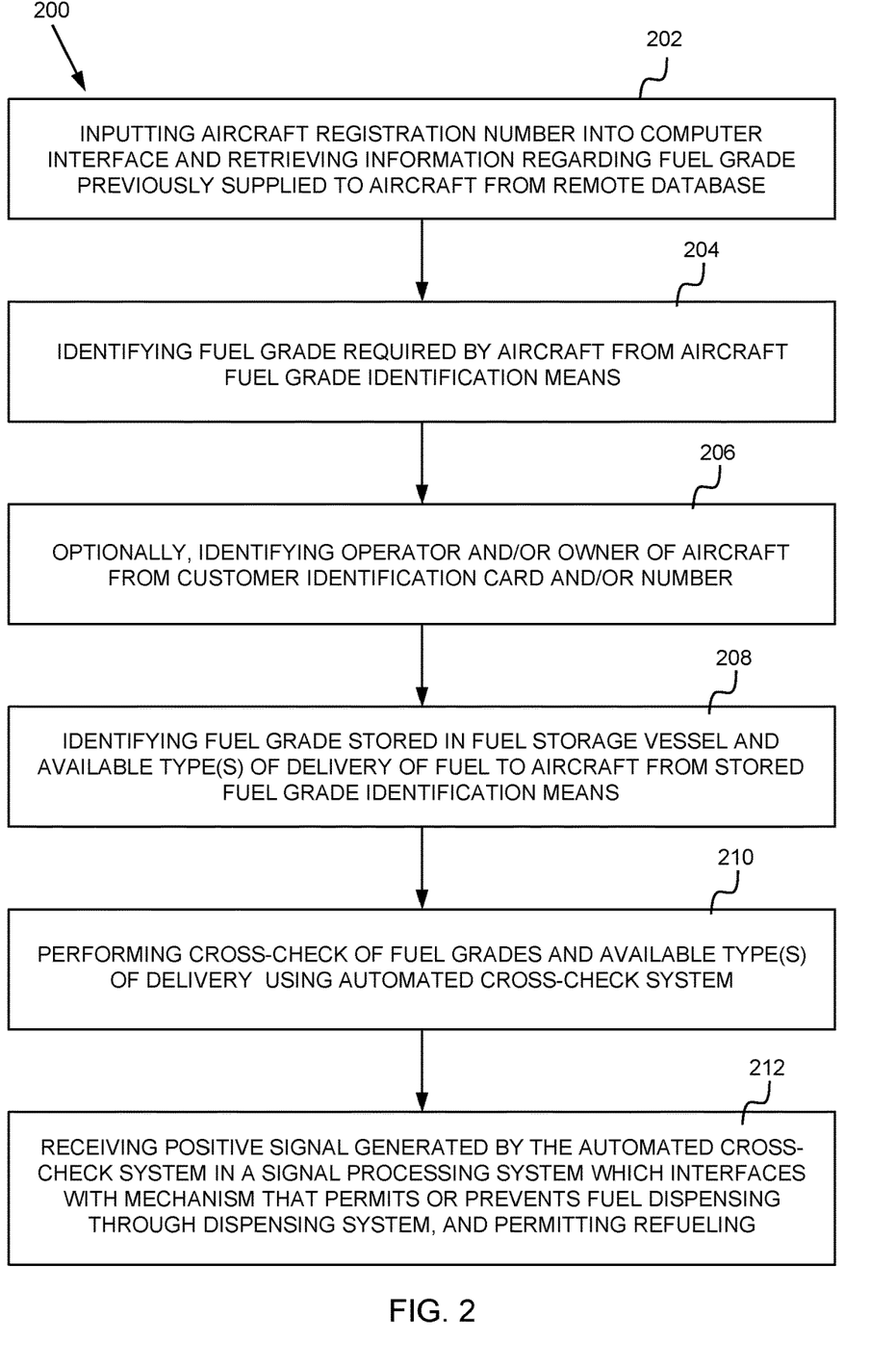
FIG. 2 shows a method.

FIG. 2 shows a method 200. At block 202, method 200 includes inputting an aircraft registration number of an aircraft to be refuelled into a computer interface and, using a transmission and receiving system, retrieving information regarding the fuel grade that had previously been supplied to the aircraft having the aircraft registration number inputted into the computer interface and the type of delivery of fuel which may be used by said aircraft from a remote database. At block 204, method 200 includes identifying, using a hand-held device, the fuel grade required by the aircraft by reading the fuel grade indicated on an aircraft from an aircraft fuel grade identification means attached to, or forming part of, an aircraft, where the aircraft fuel grade identification means is readable from the exterior of the aircraft. At block 206, method 200 optionally includes identifying the operator and/or owner of the aircraft from a customer identification card and/or number, and obtaining at least the customer name and the fuel grade from a customer identification system, where the customer identification system includes a processing system which comprises a transmission and receiving system, where the customer identification system is capable of obtaining at least the customer name and the fuel grade from the customer identification card and/or a database entry associated with the customer identification number. At block 208, method 200 includes identifying the fuel grade stored in the fuel storage vessel and available type(s) of delivery of the fuel to the aircraft from a stored fuel grade identification means. At block 210, method 200 includes performing a cross-check of the fuel grades and available type(s) of delivery using an automated cross-check system, where the automated cross-check system is configured to retrieve the fuel grades identified in block 204 and block 208, retrieve the type(s) of delivery of fuel identified in block 208 and by the system of block 202, and the previous fuel grade supplied to the aircraft identified by the system of block 202 and optionally also in block 206, where the automated cross-check system generates a positive response signal if all of the fuel grades identified are compatible with each other and the type(s) of delivery of fuel to the aircraft are compatible. At block 212, method 200 includes receiving the positive signal generated by the automated cross-check system in a signal processing system which interfaces with the mechanism that permits or prevents the dispensing of aircraft fuel through the fuel dispensing system, and permitting the refuelling of the aircraft to proceed.

The invention claimed is:

1. A refuelling system suitable for use with an overwing fuelled aircraft comprising:
   (a) a fuel storage vessel capable of storing aircraft fuel;
   (b) a stored fuel grade identification means for identifying the fuel grade stored in the fuel storage vessel and available type(s) of delivery of the fuel to the aircraft;
   (c) a fuel dispensing system fluidly connected to the fuel storage vessel comprising a means of delivering fuel to an overwing fuelled aircraft and a mechanism that permits or prevents the dispensing of the stored aircraft fuel;
   (d) an aircraft fuel grade identification means being attached to, or forming part of, an overwing fuelled aircraft, wherein said aircraft fuel grade identification means represents the fuel grade requirement of the aircraft and is readable from the exterior of the aircraft;
   (e) a hand-held device comprising a means for reading the aircraft fuel grade identification means;
   (f) a computer interface where the aircraft registration number can be inputted;
   (g) a transmission and receiving system which enables information regarding the fuel grade that had previously been supplied to the aircraft having the aircraft registration number inputted into the computer interface and the type of delivery of fuel which may be used by said aircraft to be retrieved from a remote database;
   (h) optionally, a customer identification system which comprises a customer identification card and/or number, and a processing system which comprises a transmission and receiving system, wherein the customer identification system is capable of obtaining at least the customer name and the fuel grade from the customer identification card and/or a database entry associated with the customer identification number;
   (i) an automated cross-check system which is configured to retrieve the fuel grades identified by the fuel identification means in (b), retrieve the fuel grade identified in (d) from the hand-held device, retrieve the type(s) of delivery of fuel identified by the fuel identification means in (b) and by the system of element (g), and the previous fuel grade supplied to the aircraft identified by the system in element (g) and optionally also in element (h), which can generate a positive response signal if all of the fuel grades identified are compatible with each other and the type(s) of delivery of fuel to the aircraft are compatible; and
   (j) a signal processing system which can process the positive response signal generated by the automated cross-check system, which signal processing system interfaces with the mechanism that permits or prevents the dispensing of aircraft fuel through the fuel dispensing system and will allow the refuelling to proceed if the automated cross-check system generates a positive signal.

2. A refuelling system as claimed in claim 1, wherein the fuel dispensing system comprises a hose wherein one end of the hose is connected to a fuel dispensing nozzle and the other end of the hose is fluidly connected to the fuel storage vessel, and wherein the mechanism which will allow the refuelling to proceed if the cross-check system provides a positive signal will prevent the dispensing of fuel through the fuel dispensing nozzle in the absence of a positive response signal.

3. A refuelling system as claimed in claim 2, wherein the fuel storage vessel is additionally equipped with a fuel dispensing system capable of delivering fuel to an aircraft by pressure fuelling and comprises an overwing fuelling isolation valve and a system which can identify the orientation of the isolation valve, and wherein the automated cross-check system additionally performs a check that the overwing fuelling isolation valve is oriented such that overwing fuelling can be performed and pressure fuelling cannot be performed, and will only permit a positive response signal to be generated if the overwing fuelling valve is so oriented.

4. A refuelling system as claimed in claim 2, wherein the fuel storage vessel is additionally equipped with a fuel dispensing system capable of delivering fuel to an aircraft by pressure fuelling and comprises an overwing fuelling isolation valve, and wherein the mechanism that permits or prevents the dispensing of stored fuel is configured such that the mechanism will prevent the dispensing of stored fuel through the fuel dispensing nozzle unless the overwing fuelling isolation valve is oriented such that overwing fuelling can be performed and pressure fuelling cannot be performed.

5. An aircraft refuelling system as claimed in claim 1, wherein the aircraft fuel grade identification means comprises a fuel grade identification symbol located on the outside of the aircraft, and the means for reading the aircraft fuel grade identification means comprises a camera on the hand-held device and image recognition software stored on or accessible by the hand-held device.

6. An aircraft refuelling system as claimed in claim 1, wherein the computer interface where the aircraft registration number can be inputted is located on the hand-held device comprising a means for reading the aircraft fuel grade identification means.

7. An aircraft refuelling system as claimed in claim 1, wherein the hand-held device also comprises the automated cross-check system.

8. An aircraft refuelling system as claimed in claim 1, wherein the hand-held device is a tablet computer.

9. An aircraft refuelling system as claimed in claim 1, wherein when the hand-held device is unable to read the aircraft fuel identification means, the aircraft fuel grade can be inputted manually.

10. An aircraft refuelling system as claimed in claim 1, wherein the fuel storage vessel forms part of a motor vehicle or forms part of a trailer that may be attached to a motor vehicle.

11. An aircraft refuelling system as claimed in claim 10, wherein the stored fuel grade identification means will comprises an electronically readable means selected from a Near-Field Communication ("NFC") device or a Radio-Frequency Identification ("RFID") device that is readable by the hand-held device, wherein the fuel grade stored in the fuel storage vessel as well as the type(s) of delivery of the fuel to the aircraft are identified on the hand-held device and this information is accessible to at least the automated cross-check system, and wherein the NFC device or the RFID device is present inside the cabin of the motor vehicle.

12. A process for refuelling an overwing fuelled aircraft from a fuel storage vessel comprising a stored aircraft fuel to the aircraft through a fuel dispensing system fluidly connected to the fuel storage vessel, wherein the fuel dispensing system comprises a mechanism that permits or prevents the dispensing of the stored aircraft fuel, wherein the process comprises the following steps:

(1) inputting the aircraft registration number of the aircraft to be refuelled into a computer interface and, using a transmission and receiving system, retrieving information regarding the fuel grade that had previously been supplied to the aircraft having the aircraft registration number inputted into the computer interface and the type of delivery of fuel which may be used by said aircraft from a remote database;

(2) using a hand-held device, identifying the fuel grade required by the aircraft by reading the fuel grade indicated on an aircraft from an aircraft fuel grade identification means attached to, or forming part of, an aircraft, wherein said aircraft fuel grade identification means is readable from the exterior of the aircraft;

(3) optionally, identifying the operator and/or owner of the aircraft from a customer identification card and/or number, and obtaining at least the customer name and the fuel grade from a customer identification system wherein the customer identification system comprises a processing system which comprises a transmission and receiving system, wherein the customer identification system is capable of obtaining at least the customer name and the fuel grade from the customer identification card and/or a database entry associated with the customer identification number;

(4) identifying the fuel grade stored in the fuel storage vessel and available type(s) of delivery of the fuel to the aircraft from a stored fuel grade identification means;

(5) performing a cross-check of the fuel grades and available type(s) of delivery using an automated cross-check system, wherein the automated cross-check system is configured to retrieve the fuel grades identified in step (2) and step (4), retrieve the type(s) of delivery of fuel identified in step (4) and by the system of step (1), and the previous fuel grade supplied to the aircraft identified by the system of step (1) and optionally also in step (3), wherein the automated cross-check system generates a positive response signal if all of the fuel grades identified are compatible with each other and the type(s) of delivery of fuel to the aircraft are compatible; and (6) receiving the positive signal generated by the automated cross-check system in a signal processing system which interfaces with the mechanism that permits or prevents the dispensing of aircraft fuel through the fuel dispensing system, and permitting the refuelling of the aircraft to proceed.

13. A process for refuelling an overwing fuelled aircraft according to claim 12, wherein steps (1), (2), and (4), and optional step (3) if present, may occur in any sequence.

14. A process for refuelling an overwing fuelled aircraft according to claim 12, wherein optional step (3) is present and steps (1) to (4) occur in the sequence (3), (1), (2), (4).

15. A process for refuelling an overwing fuelled aircraft according to claim 12, wherein optional step (3) is present and steps (1) to (4) occur in the sequence (1), (2), (3), (4).

* * * * *